Patented Oct. 19, 1937

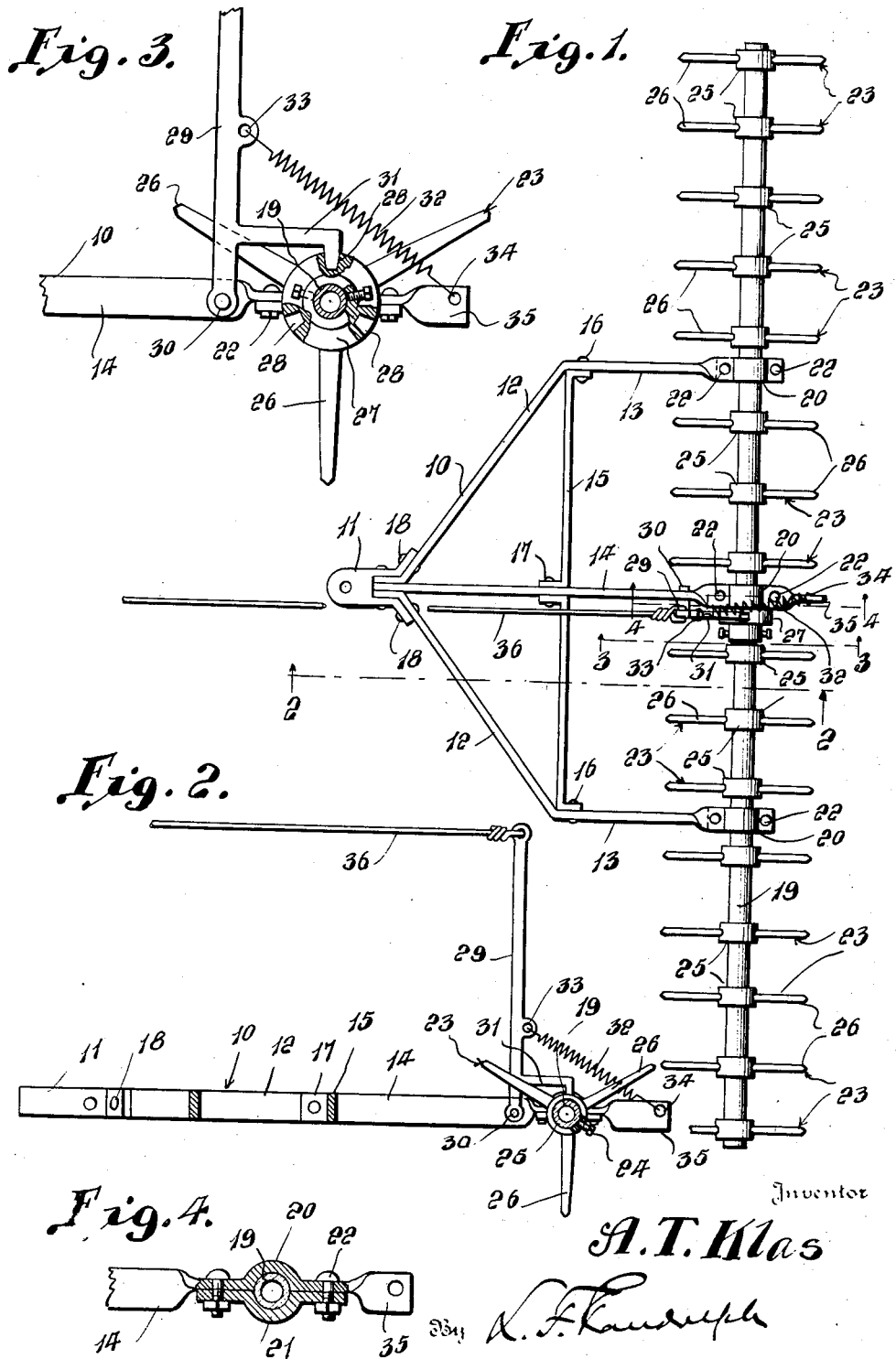

2,096,640

UNITED STATES PATENT OFFICE 2,096,640

HARROW

Alexander T. Klas, Lamesa, Tex.

Application December 17, 1936, Serial No. 116,406

1 Claim. (Cl. 55—34)

This invention relates to a harrow and it aims to provide a novel construction wherein the same may be periodically and at will cleared of trash or other clogging material.

The invention particularly concerns a harrow of the character used in the West, specially in the springtime, to harrow or cultivate the crops with a view to stopping sand from blowing after a hard rain, and which blowing or loose sand is very injurious to crops. Since the harrow according to the present invention is capable of being cleared when desired, the harrowing operation may be effected more expeditiously and efficiently.

An operative embodiment is shown in accompanying drawing wherein:—

Figure 1 is a plan view of the improved harrow;

Figure 2 is a detail section taken on the line 2—2 of Figure 1;

Figure 3 is a detail section taken on the line 3—3 of Figure 1, and

Figure 4 is a detail section taken on the line 4—4 of Figure 1.

Referring specifically to the drawing wherein like reference characters designate like or similar parts, 10 designates a suitable frame which may be drawn by a tractor or animal power as preferred, the same being suitably hitched by a clevis 11. This frame includes side members 12 having rearwardly extending bearing arms 13. A central rearwardly extending bearing arm is shown at 14 and the bearing arms 13 and 14 are braced by members 15 riveted or bolted thereto as at 16 and 17. The clevis 11 and members 10 and 14 are bolted or riveted together as at 18.

Journaled in the bearing arms 13 and 14 is a shaft 19, the bearing arms having portions 20 and detachable plates 21, arcuate and conforming to the shape of the shaft 19 and detachably connected together as by means of bolts 22.

Harrow members 23 are equidistantly spaced along the shaft 19 and by means of set screws 24, threaded in hubs 25 thereof, they are rigidly connected to the shaft. Each harrow member has a plurality of teeth or spikes 26, the same being equidistantly spaced apart and those of the different harrow members being in longitudinal rows.

Said shaft 19 is normally stationary but it may be rotated in the bearing arms 13 and 14. To prevent rotation of the shaft 19, a collar 27 is provided thereon which has peripheral sockets at 28 in line with the rows of teeth. A lever 29 is pivotally connected at 30 to the bearing bar 14 and it has a latch portion 31 thereon which is engageable in any of the three sockets 28, as best shown in Figure 3. A contractile coil spring 32 is connected at 33 to the lever 29 and at 34 to an extension 35 of the bearing bar 14. The spring 32 normally maintains the latch 31 engaged with one of the sockets 28 and thus the shaft and harrow is held stationary. A cable or other flexible draw element 36 is connected to the upper end of the lever 29 and when desired, the operator, from the draft means, may pull the cable 36 and disengage the latch 30 from a socket 28, that is, when trash is collected by the teeth and the same are clogged. When the harrow is thus released, it will rotate through the contact of the teeth 26 with the soil, thereby releasing the trash, and the harrow rotates until the latch registers with the following socket 28 into which it snaps through the urgency of the spring 32, the draw element 36 in the meantime having been released. In this manner, whenever desired, collected trash or debris may be released by permitting the normally and rotatable harrow, to rotate one hundred and twenty degrees (120°).

Various changes may be resorted to provided they fall within the spirit and scope of the invention.

I claim as my invention:—

Apparatus of the class described comprising a frame having outer bearing arms, an inner bearing arm, a shaft journaled in said bearing arms, harrows on said shaft having equidistantly spaced teeth arranged in lines, means providing equidistantly spaced sockets about the shaft, a lever pivoted to the intermediate bearing arm provided with a latch engageable with said sockets selectively, spring means urging the lever into engagement with a socket, said harrow members, through draft of the apparatus being rotatable through contact with the soil.

ALEXANDER T. KLAS.